Patented Nov. 24, 1931

1,833,161

UNITED STATES PATENT OFFICE

JOHN HELFRICH, OF WESTFIELD, NEW JERSEY, ASSIGNOR TO STAR COMPANY, OF NEW YORK, N. Y., A CORPORATION OF NEW YORK

PHOTOGRAPHIC RESIST OR FILM

No Drawing.  Application filed April 13, 1927. Serial No. 183,617.

This invention relates to improvements in photographic resists or films and more particularly to that class of light sensitive films used in photo-engraving which are adapted to be flowed on to metal plates, where said plates are etched directly for printing purposes after the development of said films.

I have devised a new resist or light sensitive film which can be equally well used on copper, zinc, brass or aluminum plates. The resist is stable and plates of uniform quality for printing purposes can be rapidly made by the use thereof.

My improved composition of matter is made as follows: 12 ounces of bleached white shellac, 17½ ounces of orange shellac, and 7¾ ounces of borax are mixed together and to these three ingredients are added 24 ounces of a dragon's blood solution. This dragon's blood solution is made by dissolving 16 ounces of dragon's blood in 69 fluid ounces of methyl-alcohol $CH_3OH$. The four ingredients, bleached white shellac, orange shellac, borax and dragon's blood solution are now added to 200 fluid ounces of water and the entire mixture is boiled for twenty minutes in which time all of the solid ingredients go into solution. This mixture is then cooled.

I then separately prepare the following solution.

I dissolve 3.1 ounces of ammonium chromate $(NH_4)_2CrO_4$ in 40 fluid ounces of water. To the solution of ammonium chromate I add one ounce of an aniline tinctorial dye and for this purpose I prefer a solution of eosin. A dye which I prefer to use for this purpose is made by dissolving 10 grains of eosin A which is an alkaline salt of tetrabromo-fluoresceine in 16 fluid ounces of water and of this eosin solution I employ one ounce with the aforesaid solution of 3.1 ounces of ammonium chromate. Heretofore it has been customary to dissolve the shellac or the like in a solution of ammonia water $(NH_4OH)$ in order to prepare the resist. This was objectionable because the use of ammonia solution was disagreeable. In addition I have discovered that if the resist is used with a copper plate, that the presence of the ammonia causes copper to enter the resist, which either destroys or weakens the sensitiveness of the resist to the action of light.

The chromate eosin solution is then mixed with the shellac-dragon's blood solution above mentioned and carefully filtered. After filtering, it is boiled and kept in a cool dark place.

I have found this composition especially adapted as a resist or photographic film for the etching of zinc and other metallic plates such as copper. Such a film can be developed with the ordinary developers heretofore used for the development of shellac-chromium films and as they are well known to the photo-engraving art, I do not give any formulas for such developers herein. While I prefer to use ammonium chromate, it is well-known that other oxidizing compounds have a similar action upon shellac, and these other oxidizing compounds are to be considered as equivalents for the purposes of my invention.

The advantage of using the borax is that it permits the formation of an aqueous solution of the shellac and dragon's blood. This gives a clearer solution than if ammonium hydroxide was used. The solution made according to my invention is substantially free from slime, it is easier to filter and the operator is not annoyed by the fumes of ammonia when the metal plate is being coated. Likewise, the borax solution can be used on copper plates because borax does not attack copper. Likewise, it will be noted that I use ammonium chromate instead of ammonium bichromate. Ammonium bichromate is not effective for the purposes of my invention, because when this salt is added to a borax solution of shellac, a precipitation of the dissolved shellac is produced. This is because ammonium bichromate is too acid in reaction, and I therefore utilize a substantially neutral chromate.

Having fully described my invention, what I claim is:

1. A composition of matter for a light sensitive photographic film comprising shellac, borax, dragon's blood, ammonium chromate and eosin.

2. A composition of matter for a light sensitive photographic film comprising shellac, borax, dragon's blood, ammonium chromate and an aniline dye.

3. A composition of matter for a light sensitive photographic film comprising shellac, a non-volatile solvent for said shellac, dragon's blood, ammonium chromate and eosin.

4. A composition of matter for a light sensitive photographic film comprising a mixture of white and orange shellac, borax, ammonium chromate and eosin A.

5. A process of preparing a light sensitive photographic film by dissolving shellac and borax, adding thereto a solution of dragon's blood and mixing said solution with a solution of ammonium chromate and eosin.

6. A method of securing a solution of a light sensitive resist for a metal plate which consists in dissolving dragon's blood and shellac in a solvent which is unaffected by copper, and then adding thereto a solution of ammonium chromate in a solvent which is also unaffected by copper.

7. A solution of a light-sensitive resist intended and adapted to be applied to a metal plate, said solution including shellac and ammonium chromate, said solution being substantially free from material adapted to attack the plate to which the resist is to be applied.

8. A solution of a light-sensitive resist intended and adapted to be applied to a metal plate, said solution including shellac and ammonium chromate, and being substantially free from ammonia.

9. A solution of a light-sensitive resist intended and adapted to be applied to a metal plate, said solution consisting substantially of water containing dissolved borax and dissolved shellac and dissolved ammonium chromate, and solution being substantially free from material adapted to attack the plate to which the resist is to be applied.

In testimony whereof I affix my signature.

JOHN HELFRICH.